Patented Sept. 11, 1951

2,567,661

UNITED STATES PATENT OFFICE 2,567,661

ZIRCONIUM AND HAFNIUM RECOVERY AND PURIFICATION PROCESS

John A. Ayres, Schenectady, N. Y., assignor to the United States of America as represented by the United States Atomic Energy Commission No Drawing. Application August 31, 1948, Serial No. 47,131

9 Claims. (Cl. 23—24)

This invention relates to a process for the purification of zirconyl nitrate, hafnyl nitrate, and mixtures thereof, and more specifically relates to the removal of impurities from colloidal solutions of hydrous oxides obtained by adding zirconyl nitrate and hafnyl nitrate to water.

In the recovery of zirconium and hafnium values from ores containing the same, there is produced by various recovery processes zirconyl nitrate, hafnyl nitrate and mixtures thereof, which contain a fair percentage of impurities, namely, other metal nitrates. For example, in the recovery of zirconium and hafnium from a sample of alvite, which is an altered zircon, there is obtained a mixture of zirconyl nitrate and hafnyl nitrate having as impurities titanium nitrate and ferric nitrate.

It is an object of the present invention to provide a process for the removal of impurities from zirconyl nitrate, hafnyl nitrate, and mixtures thereof.

Another object of this invention is to purify aqueous colloidal solutions of hydrous zirconium oxide and hydrous hafnium oxide.

Other objects of the present invention will be apparent from the description which follows.

I have found that when an impure metal oxynitrate of the group consisting of zirconyl nitrate, and hafnyl nitrate, and mixtures thereof is added to water and the resultant aqueous colloidal solution from the metal oxynitrate is contacted with a synthetic organic cation exchange resin, the impurities are removed by cation exchange and the effluent contains a major amount of the hydrous metal oxide. As will be seen from the examples below, this process has wide application for removal of impurities from zirconium, hafnium, and mixtures thereof. The examples illustrate the removal of iron, titanium, beryllium, and rare earths, such as lanthanum, as impurities by the process of this invention; but the invention is not limited thereto, since it is applicable for removal of any impurity whose nitrate upon contact with a synthetic organic cation exchange resin will exchange cations with the resin.

In carrying out the process of this invention, the metal values of the metal oxynitrate should be present in the aqueous solution as a hydrous oxide in greater than a tracer concentration, since at tracer concentrations the hydrous oxide is adsorbed by the exchange resin even though there is no transfer of cations. A suitable concentration of hydrous oxide is 0.001 M and above, such as 0.1 M. In the same regard the amount of cation exchange resin used for a particular volume of aqueous colloidal solution of hydrous oxide should be considerably less than the amount which would completely adsorb the hydrous oxide. However, the ratio of cation exchange resin to aqueous colloidal solution can be varied over a wide range, since the surface adsorption capacity of the resin is very small compared with the ion exchange capacity of the resin. As it will be seen below, the surface adsorption capacity of a sulfonated phenol-formaldehyde resin was 0.00084 mole/100 cc. of resin. This may be compared with the ion exchange capacity of the same resin which is given as 0.020 mole/100 cc. of resin.

It is permissible for the aqueous colloidal solution of metal oxynitrate to contain a small amount of nitric acid, such as 0.2 N nitric acid. Such low acidity will not prevent the formation of hydrous metal oxides of zirconium and hafnium which will not be removed by the ion exchange resin.

A suitable cation exchange resin is a sulfonated phenol-formaldehyde resin, such as "Amberlite IR–100." Other synthetic cation exchange resins may be used, for example, the newly developed synthetic cation exchange resin, "Dowex 50." According to the article in J. Am. Chem. Soc. 69, 2830 "Dowex 50" is "an aromatic hydrocarbon polymer of the type described by D'Alelio in U. S. Patent 2,366,007 containing nuclear sulfonic acid groups as the sole ion-active group at any pH value." The cation exchange resin may be used in either the hydrogen form or the alkali metal form. The hydrogen form is preferred.

The following examples illustrate various embodiments of the present invention. In all of these examples columns of the cation exchange resin "Amberlite IR–100" were prepared as follows: The columns were of glass, 1 cm. internal diameter, and 1 m. in height. The bottom of the column was constricted and contained a plug of glass wool to support the cation exchange resin bed. The flow rate of solutions through these columns was regulated by means of a pinch clamp. The columns were filled with the ion exchange resin to a depth of 45 to 50 cm. To obtain the hydrogen form, the cation exchange resin was backwashed and then conditioned by pouring 250 ml. of 2.5% sulfuric acid through at a flow rate of 5 to 6 ml. per minute (70 gal./sq. ft./hr.) and then backwashing until the washings gave no test for sulfate ion. The sodium form was obtained by pouring 250 ml. of sodium sulfate through at the same flow rate and then backwashing until the washings gave no test for sulfate ion.

EXAMPLE I

A stock solution of zirconium nitrate was prepared by dissolving 10 g. of $ZrO(NO_3)_2 \cdot 2H_2O$ in water and diluting to one liter. Of this stock solution 200 ml. was poured through a column filled with the cation exchange resin in the hydrogen form at a flow rate of 5 to 6 ml./min. Through another column of the resin in the sodium form an equal volume of the stock solution was passed at the same rate. The original solution and the effluent were analyzed for zirconium by taking an aliquot, precipitating the zirconium with ammonium hydroxide, igniting to the oxide, and weighing. The data are shown below in Tables I and II.

TABLE I

*Recovery of zirconium in hydrogen cycle*

$ZrO_2$ in aliquot of original solution___mg__ 107.0
$ZrO_2$ in effluent from same volume___mg__ 105.3
Recovery _____per cent__ 98

TABLE II

*Recovery of zirconium in sodium cycle*

$ZrO_2$ in aliquot of original solution___mg__ 783
$ZrO_2$ in effluent from same volume___mg__ 775
Recovery _____per cent__ 99

EXAMPLE II

The capacity of the column for any ion is usually measured by pouring a feed solution through at a flow rate used in normal operation and noting the amount adsorbed at the time that the effluent contains an appreciable amount of ion. This point is called the break-through and is usually taken as the time at which the concentration in the effluent is about 5% of that of the feed solution. Since the amounts to be analyzed were so small, radioactive techniques were used.

A solution containing 4 mg. of $HfO(NO_3)_2$ and 254 mg. of $ZrO(NO_3)_2$ with $Hf^{181}$ as tracer was made up to 500 ml. to serve as the feed solution. The activity was 60 divisions/min./ml. as measured on a Lauritsen electroscope. Since $Hf^{181}$ activity can be obtained and kept pure while $Zr^{95}$ contains the daughter $Cb^{95}$, the hafnium tracer was used under the assumption that the two elements behave alike on an ion-exchange column. This assumption was shown valid in some preliminary experiments in which the attempt was made to separate hafnium from zirconium by the ion exchange method. Such a separation was found impossible because both elements were present as colloids and did not undergo ion exchange. A comparison of the gross analyses by weight and tracer analyses showed no separation of zirconium and hafnium.

This solution was poured through a column of the cation exchange resin 1 cm. internal diameter and 50 cm. high at a flow rate of 2 ml./min. At intervals samples of the effluent were taken, evaporated, and measured on the electroscope.

From the results, it was seen that the break-through came at about 150 ml. This corresponded to 0.00033 mole. This calculated to 0.00084 mole/100 cc. of resin.

EXAMPLE III

A solution containing 2 g. of $Fe(NO_3)_3 \cdot 9H_2O$ was added to 200 ml. of the stock solution of Example I and the resultant solution was poured through a column of the cation exchange resin in the hydrogen form at a flow rate of about 5 ml./min. The feed and the effluent were analyzed for zirconium and iron. The experiment was run in duplicate to give the results in Table III.

TABLE III

*Iron and zirconium in feed and effluent*

|  |  | Run 1, mg. | Run 2, mg. |
|---|---|---|---|
| Feed | $Fe_2O_3$ | 400 | 400 |
|  | $ZrO_2$ | 900 | 900 |
| Effluent | $Fe_2O_3$ | 7.9 | 7.0 |
|  | $ZrO_2$ | 890 | 901 |

EXAMPLE IV

Ammonium hydroxide was added to an aqueous solution of titanium sulfate and a precipitate was separated and dissolved in nitric acid. Excess nitric acid was removed by dialysis until the acidity was 0.4 N nitric acid. An aliquot of the solution was combined with a solution of zirconyl nitrate and diluted to 150 ml. This dilute nitric acid solution was poured through a column of the cation exchange resin in the hydrogen form. Analyses of the feed and effluent solutions gave the results shown in Table IV.

TABLE IV

*Titanium and zirconium in feed and total effluent*

|  | Feed solution | Effluent and wash |
|---|---|---|
| Volume, ml | 150 | 180 |
| $TiO_2$, mg | 168.5 | 27.3 |
| $ZrO_2$, mg | 267.8 | 253.5 |
| Acidity ($HNO_3$), N | 0.2 | ---------- |

The feed and effluent solutions of Examples III and IV were analyzed as follows: The iron was determined colorimetrically with o-phenanthroline and the titanium was determined by reducing with a Jones reductor, titrating with ceric sulfate, and correcting for the iron present. An aliquot of the solution was made alkaline with ammonium hydroxide and the precipitated hydroxides were filtered, ignited and weighed. After a correction was made for titanium oxide and iron oxide the remainder was considered as zirconium and hafnium oxides and shown in Tables III and IV as $ZrO_2$. It should be noted that no correction was made for the rare earths or aluminum present. This would give an apparent loss of zirconium.

EXAMPLE V

A feed solution was prepared by dissolving 1.4 g. of $La(NO_3)_3 \cdot 6H_2O$ in 40 ml. of water and adding this to 200 ml. of the stock zirconium nitrate solution of Example I. The recovery of zirconium in the effluent was again about 100%. An attempt was made to analyze the effluent for lanthanum but the total amount present was too small to give any accurate estimate. It was concluded that the amount of lanthanum unadsorbed was less than 1%.

EXAMPLE VI

A 100-g. sample of alvite, an altered zircon containing a high percentage of hafnium, was ground to pass through a 100-mesh screen and then digested with twice its weight of concentrated sulfuric acid on a sand-bath for two to three hours. After cooling, the resulting mud was suspended in water, treated with hydrofluoric acid for silica removal, and centrifuged. The clear liquid was fumed with sulfuric acid, water was added, and the solids were removed by centrifuging. A quantity of the resultant clear liquid was treated with ammonium hydroxide to precipitate hydroxides which were separated by centrifuging. The precipitate was washed and dissolved in nitric acid. The nitric acid solution was evaporated to dryness, the residue was taken up in water, and then an aliquot of the solution was run through a column filled with the cation exchange resin in the hydrogen form. The analyses of feed and effluent are presented below in Table V.

TABLE V

*Purification of ore extract*

|  | Original | Effluent | Per Cent in Effluent |
|---|---|---|---|
|  | Grams | Grams |  |
| $ZrO_2$ | 1.187 | 1.1377 | [1] 95.5 |
| $TiO_2$ | 0.161 | 0.033 | 20.5 |
| $Fe_2O_3$ | 0.0367 | 0.00189 | 5.15 |

[1] No correction for rare earths or aluminum, giving apparent low yield.

EXAMPLE VII

A solution containing 0.0096 mole of beryllium nitrate was poured through a column of the cation exchange resin. The effluent was made alkaline with ammonium hydroxide but no precipitate was visible, showing that all the beryllium was removed by the ion exchange resin. The beryllium was eluted with 125 ml. of 2.5% sulfuric acid. The eluate was analyzed and found to contain 246 mg. of beryllium oxide, or a recovery of 103%. This example shows that a beryllium impurity can be removed from zirconium, hafnium, and mixtures thereof by the process of this invention.

From the foregoing it is seen that very pure zirconium salts may be obtained from ores by the process of the present invention. A feed solution containing only 85% zirconium and 15% impurities, such as iron, beryllium, rare earths, and titanium, may be passed through a column to give a salt 97% pure. If the solution is passed through another column the effluent will be 99.4% pure zirconium. The greater part of the impurity is titanium which is removed less efficiently. This procedure is rapid and may be easily adapted to large scale procedures. It is especially valuable for removing last traces of impurities to give a highly purified product.

While various embodiments of the present invention have been described, it is to be understood that this invention is not to be limited to these embodiments, but is only to be limited by the following claims.

What is claimed is:

1. A process for the purification of an aqueous colloidal solution of a hydrous oxide of a metal of the group consisting of zirconium, and hafnium, and mixtures thereof, which comprises contacting said colloidal solution of said hydrous oxide present in greater than a tracer concentration and containing a relatively smaller concentration of a soluble metal nitrate with a synthetic organic cation exchange resin, and separating an aqueous solution containing a major amount of said hydrous metal oxide and a reduced amount of said metal nitrate.

2. A process for the purification of an aqueous colloidal solution of a hydrous oxide of a metal of the group consisting of zirconium, and hafnium, and mixtures thereof, which comprises contacting said colloidal solution of said hydrous oxide present in greater than a tracer concentration ond containing a relatively smaller concentration of a soluble metal nitrate with a sulfonated phenol-formaldehyde resin, and separating an aqueous solution containing a major amount of said hydrous metal oxide and a reduced amount of said metal nitrate.

3. The process of claim 2 wherein the metal nitrate is ferric nitrate.

4. The process of claim 2 wherein the metal nitrate is titanium nitrate.

5. The process of claim 2 wherein the metal nitrate is a rare earth metal nitrate.

6. The process of claim 5 wherein the rare earth metal nitrate is lanthanum nitrate.

7. A process for the purification of zirconium values recovered as impure zirconyl nitrate from zirconium-containing ores, which comprises adding said impure zirconyl nitrate in greater than a tracer concentration to water, contacting the resultant colloidal solution of a hydrous oxide of zirconium with a synthetic organic cation exchange resin, and separating an aqueous solution substantially free of said impurities and containing a major amount of said hydrous oxide of zirconium.

8. A process for the purification of zirconyl nitrate containing impurities, which comprises adding said zirconyl nitrate in greater than a tracer concentration to water, passing the resultant colloidal solution of a hydrous oxide of zirconium through a bed of a synthetic organic cation exchange resin, and collecting an effluent substantially free of said impurities and containing a major amount of said hydrous oxide of zirconium.

9. The process of claim 8 wherein the impurities are titanium nitrate and ferric nitrate and the cation exchange resin is a sulfonated phenol-formaldehyde resin.

JOHN A. AYRES.

REFERENCES CITED

The following references are of record in the file of this patent:

UNITED STATES PATENTS

| Number | Name | Date |
|---|---|---|
| 1,978,447 | Austerweil | Oct. 30, 1934 |
| 2,102,642 | Otting | Dec. 21, 1937 |

FOREIGN PATENTS

| Number | Country | Date |
|---|---|---|
| 805,092 | France | Aug. 17, 1936 |

OTHER REFERENCES

Sussman et al., I. and E. Chem., vol. 37, pages 618–624 (1945).

Street et al., The Ion Exchange Separation of Zirconium and Hafnium, AECD-2435, 2 pages. Dated October 11, 1943, declassified November 10, 1948, Tech. Information Branch, Oak Ridge, Tenn.